(12) United States Patent
Thayer et al.

(10) Patent No.: US 8,386,702 B2
(45) Date of Patent: Feb. 26, 2013

(54) MEMORY CONTROLLER

(75) Inventors: Larry J. Thayer, Fort Collins, CO (US); Leith L. Johnson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1834 days.

(21) Appl. No.: 11/261,270

(22) Filed: Oct. 27, 2005

(65) Prior Publication Data

US 2007/0101094 A1   May 3, 2007

(51) Int. Cl.
*G06F 12/00* (2006.01)
(52) U.S. Cl. ............... 711/108; 711/202; 711/E12.103; 711/E12.002
(58) Field of Classification Search .................. 711/202, 711/118
See application file for complete search history.

(56) References Cited

U.S. PATENT DOCUMENTS

| | | | |
|---|---|---|---|
| 6,941,423 B2* | 9/2005 | Coulson | 711/141 |
| 2002/0091965 A1* | 7/2002 | Moshayedi | 714/8 |
| 2004/0088490 A1* | 5/2004 | Ghosh | 711/137 |
| 2006/0062046 A1* | 3/2006 | Babudri et al. | 365/185.09 |
| 2006/0087943 A1* | 4/2006 | Kuraoka et al. | 369/53.2 |
| 2007/0094551 A1* | 4/2007 | Lambert et al. | 714/710 |

FOREIGN PATENT DOCUMENTS

WO   WO 2005024843 A1 *  3/2005

* cited by examiner

*Primary Examiner* — Charles Rones
*Assistant Examiner* — Aracelis Ruiz

(57) ABSTRACT

In one embodiment, a memory control system is provided with a memory controller having 1) a first interface to receive memory read/write requests; 2) a second interface to read/write data from a number of memory modules; 3) a memory cache containing spare memory locations; and 4) logic to, upon receipt of a memory read/write request, i) direct the read/write request to the memory cache when an address associated with the read/write request resides in the memory cache, and ii) direct the read/write request to the second interface when the address associated with the read/write request does not reside in the memory cache.

23 Claims, 2 Drawing Sheets

MEMORY CONTROLLER

BACKGROUND

A modern computer system comprises a processor, a data store (e.g., a hard drive) and a memory system. The memory system comprises one or more memory modules and a memory controller. While the data store provides a means to store a much greater quantity of data than can be stored in the memory modules, the structure of the memory modules enables the processor to access data from the memory modules more quickly.

During normal operation of the computer system, and under control of an operating system, the processor causes the memory controller to transfer data between the data store and the memory modules, and between the memory modules and the processor.

From time-to-time, part or all of a memory module may fail. If the module experiences a catastrophic failure, the memory module may need to be replaced. However, many failures take the form of hard or intermittent failures of a single bit (or small, localized set of bits). Some operating systems respond to these smaller memory failures as if they were larger errors by, for example, de-allocating an entire page of memory locations (i.e., de-allocating much more memory than is necessary to isolate the memory failure). Other operating systems do not respond to memory failures at all, thereby resulting in slower memory response times and/or risking the loss of data.

BRIEF DESCRIPTION OF THE DRAWINGS

Illustrative embodiments of the invention are illustrated in the drawings, in which.

DETAILED DESCRIPTION

Figure 1:
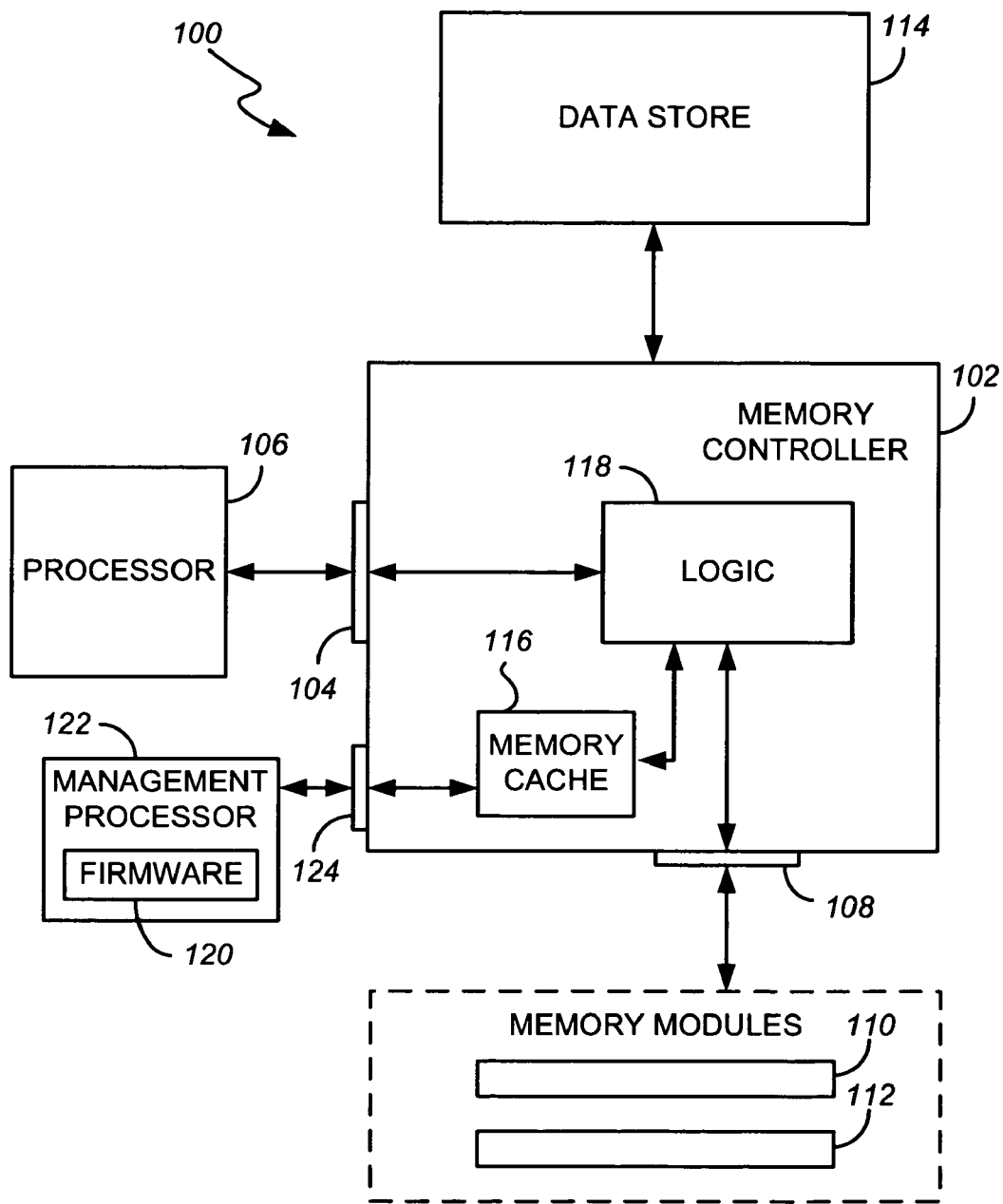
FIG. 1 illustrates an exemplary computer system comprising an exemplary memory controller.

FIG. 1 illustrates an exemplary computer system 100 comprising an exemplary memory controller 102. The memory controller 102 comprises an interface 104 to receive memory read requests and memory write requests (i.e., memory read/write requests) from, for example, a processor 106 that is logically connected to the interface 104. The memory controller 102 also comprises a second interface 108 to read/write data from a number of memory modules 110, 112 that are connected to the interface 108.

The memory module(s) 110, 112 may take various forms, but will typically comprise printed circuit boards having one or more random access memories (RAMs) mounted thereon. Each of the RAMs provides a plurality of addressable memory locations in which data retrieved from a data store 114 may be temporarily stored for faster access by the processor 106.

During normal operation of the computer system 100, and under control of an operating system, the processor 106 causes the memory controller 102 to transfer data between the data store 114 and the memory modules 110, 112, and between the memory modules 110, 112 and the processor 106. From the memory controller's perspective, and in terms of the first and second interfaces 104, 108, it receives read/write requests from the processor 106, dispatches the read/write requests to the memory module(s) 110, 112, and returns data that is read from the memory module(s) 110, 112 to the processor 106.

On occasion, a portion of a memory module may fail. Often, the failure will take the form of a hard or intermittent failure of a single bit (or a small, localized set of bits). However, even when a memory failure is small or localized, a computer's operating system may respond to the failure by de-allocating an entire page of memory locations (i.e., the entire page of memory locations in which the failed memory portion lies). When a page of memory is de-allocated, its memory locations are no longer used to store data, and a computer system's performance may suffer. On the other hand, some operating systems do not respond to memory failures at all. This can also cause a computer system's performance to suffer, and may risk the loss of data.

To mitigate the above-described situations, in which a computer's operating system de-allocates significantly more memory than has failed (or fails to respond to memory failures at all), the memory controller 102 comprises a memory cache 116 containing spare memory locations 200. The memory controller 102 also comprises logic 118 to, upon receipt of a memory read/write request, 1) direct the read/write request to the memory cache 116 when an address associated with the read/write request resides in the memory cache 116, and 2) direct the read/write request to the second interface 108 when the address associated with the read/write request does not reside in the memory cache 116.

Upon failure of a portion of a memory module 110, 112 connected to the second interface 108, firmware 120 that is stored and/or executed by any one or more of the memory controller 102, the processor 106, the memory modules 110, 112 (for firmware storage only), a management processor 122, or some other device causes one of the spare memory locations of the memory cache 116 to be mapped to the failed portion of the memory module. The firmware 120 may also cause the contents of the failed portion of the memory module 110, 112 to be copied into one of the spare memory locations. In this manner, the memory controller 102, in combination with the firmware 120, forms a memory control system that can mitigate (and often prevent) a computer's operating system from de-allocating memory locations that are fully functional.

In the computer system 100, and by way of example, the firmware 120 is shown to be executed by a management processor 122 coupled to the memory controller 102 via an interface 124.

An exemplary and more detailed description of the memory cache 116 will now be provided.

Figure 2:
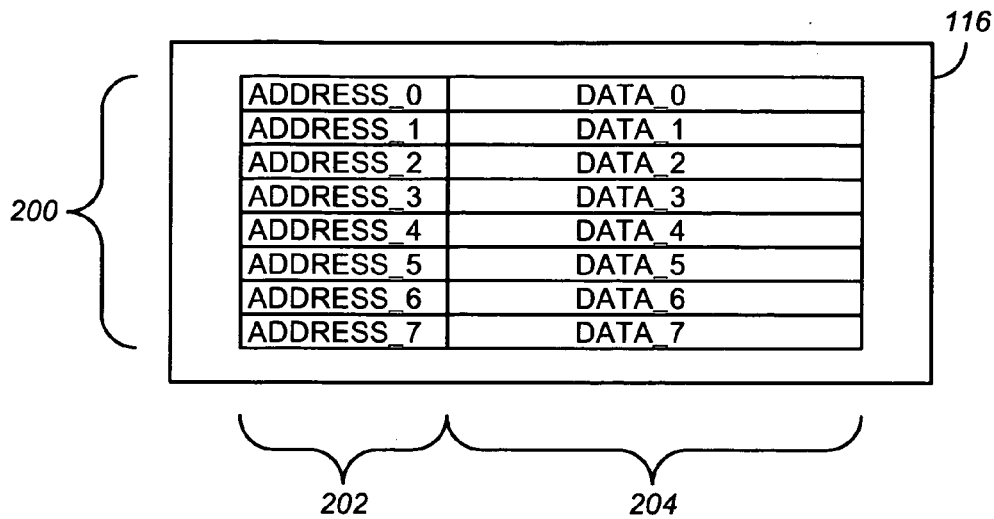
FIG. 2 illustrates an exemplary embodiment of a memory cache of the FIG. 1 memory controller.

In one embodiment, each of the spare memory locations 200 (FIG. 2) of the memory cache 116 corresponds to a memory "block" (or "line"). However, the spare memory locations could alternately be sized to correspond to various functional units (i.e., portions) of memory 110, 112.

The number of spare memory locations in the memory cache 116 may also vary. However, given that 1) the relative cost of implementing a larger memory cache 116 can be significant, and 2) if a memory module 110, 112 experiences a failure, the failure will usually be a complete failure, or a failure in only a small, localized portion of the memory module 110, 112, it will usually be desirable to limit the number of spare memory locations 200 to a relatively small number, such as eight.

The structure of the memory cache 116 may also vary. However, given that the cache 116 will usually be small, it may often be implemented as a fully associative cache, wherein a physical memory address 202 is stored along with the contents 204 of a portion of memory that corresponds to the address. See, FIG. 2. In addition, entries in the memory cache 116 may store information such as 1) a valid bit, 2) an identifier of a connected memory module 110, 112 to which a spare memory location 200 is mapped, or 3) an identifier of a RAM to which a spare memory location 200 is mapped. Valid bits may be used by the logic 118 to determine whether an address associated with a read/write request should be compared to addresses stored in the cache. The identifiers of memory modules or RAMs may be useful in managing how the cache's spare memory locations 200 are used (e.g., upon exhaustion of the memory cache's capacity, as will be described in greater detail later in this description).

Of note, in a computer system 100 having a plurality of installed memory modules 110, 112, different ones of a memory cache's spare memory locations 200 may be mapped to different ones of the system's memory modules 110, 112.

An exemplary and more detailed description of the firmware 120 will now be provided.

In one embodiment, the firmware 120 may monitor error correction activity corresponding to read/write requests that are dispatched via the interface 108. In response to this monitoring, the firmware 120 may then determine whether portions of memory appear to have failed. For example, the firmware 120 may monitor "if" and/or how many times data needs to be error-corrected, and may then determine whether a memory location has failed (or is failing).

As previously alluded to, there may be times when the capacity of the memory cache 116 becomes exhausted. In such a case, the firmware 120 may allow memory failures to be reported to a computer's operating system. However, in some embodiments, the firmware 120 may be configured to report failures which result in the least number of functional memory locations being de-allocated by a computer's operating system. For example, in one embodiment, the firmware 120 may track the distribution of failed portions of memory modules 110, 112, possibly by storing identifiers of the memory modules 110, 112 and/or RAMs to which the spare memory locations 200 are mapped. Then, upon exhaustion of the memory cache's capacity, the firmware 120 may manage use of the memory cache's spare memory locations 200 by causing a spare memory location 200 that is mapped to 1) a failed portion of a memory module that resides in an area of a memory module having more failures to be remapped to 2) a failed portion of a memory module that resides in an area of a memory module having fewer failures. In this manner, memory failures corresponding to more densely failed portions of memory 110, 112 are more likely to be reported back a computer's operating system—resulting in pages of memory with a greater distribution of memory failures being de-allocated in lieu of pages of memory with a lesser distribution of memory failures being de-allocated.

In another embodiment, the firmware 120 may track whether spare memory locations 200 are in use as a result of permanent or intermittent errors. Then, upon exhaustion of the memory cache's capacity, the firmware 120 may manage use of the cache's spare memory locations 200 by causing a spare memory location mapped to 1) an intermittently failed portion of a memory module to be remapped to 2) a permanently failed portion of a memory module.

Figure 3:
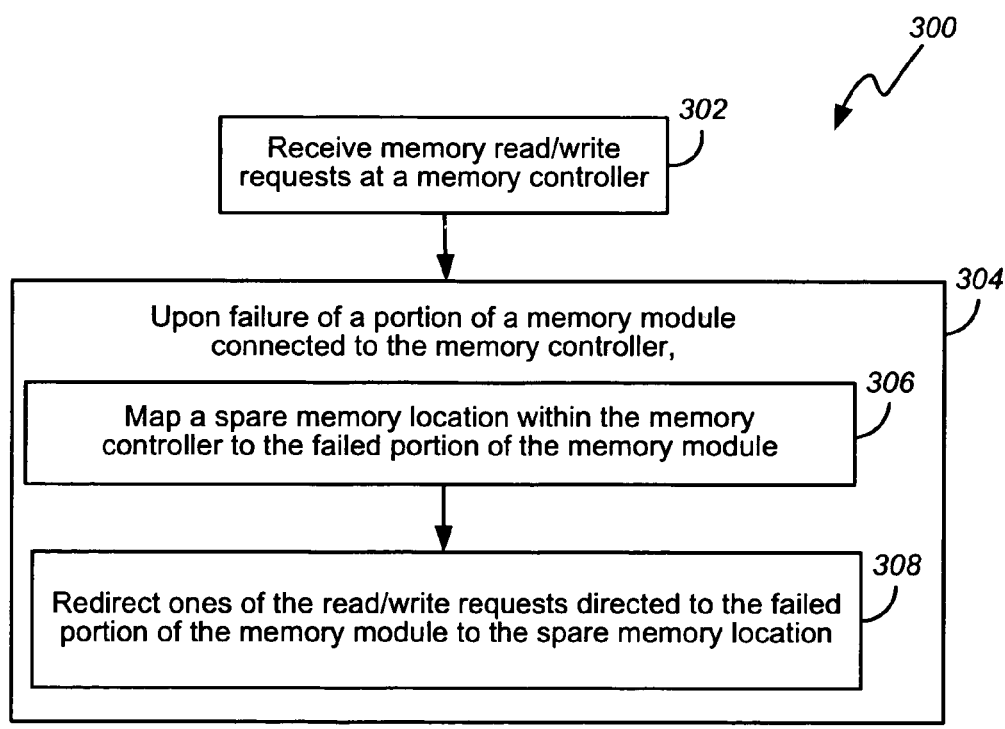
FIG. 3 illustrates an exemplary method for responding to memory failures using, for example, the FIG. 1 memory controller.

FIG. 3 illustrates an exemplary method 300 for responding to memory failures using, for example, a device such as the memory controller 102 shown in FIG. 1. The method 300 comprises receiving 302 memory read/write requests at a memory controller, and then, upon failure 304 of a portion of a memory module that is connected to the memory controller, 1) mapping 306 a spare memory location within the memory controller to the failed portion of the memory module, and 2) redirecting 308 ones of the read/write requests directed to the failed portion of the memory module to the spare memory location.

What is claimed is:

1. A memory control system, comprising:
a memory controller having,
a first interface to receive memory read/write requests;
a second interface to read/write data from a number of memory modules;
a memory cache containing spare memory locations; and
logic to, upon receipt of a memory read/write request, i) direct the read/write request to the memory cache when an address associated with the read/write request resides in the memory cache, and ii) direct the read/write request to the second interface when the address associated with the read/write request does not reside in the memory cache; and
firmware to, upon failure of a portion of a memory module connected to the second interface, cause one of the spare memory locations to be mapped to the failed portion of the memory module.

2. The memory control system of claim 1, wherein the spare memory locations are memory blocks.

3. The memory control system of claim 1, wherein, upon failure of the portion of the memory module connected to the second interface, the firmware causes contents of the failed portion of the memory module to be copied into the one of the spare memory locations.

4. The memory control system of claim 1, wherein the firmware monitors error correction activity corresponding to read/write requests dispatched via the second interface, to determine when the portion of the memory module appears to have failed.

5. The memory control system of claim 1, wherein for each of the spare memory locations in use, the firmware stores an identifier of a connected memory module to which the spare memory location is mapped.

6. The memory control system of claim 1, wherein for each of the spare memory locations in use, the firmware stores an identifier of a random access memory to which the spare memory location is mapped, the random access memory being a part of a memory module connected to the second interface.

7. The memory control system of claim 1, wherein the firmware tracks whether spare memory locations are in use as a result of permanent or intermittent errors and, upon exhaustion of the memory cache's capacity, the firmware manages use of the spare memory locations by causing a spare memory location mapped to i) an intermittently failed portion of a memory module to be remapped to ii) a permanently failed portion of a memory module.

8. The memory control system of claim 1, wherein the firmware tracks a distribution of failed portions of memory modules and, upon exhaustion of the memory cache's capacity, the firmware manages use of the spare memory locations by causing a spare memory location mapped to i) a failed portion of a memory module that resides in an area of a memory module having more failures to be remapped to ii) a failed portion of a memory module that resides in an area of a memory module having fewer failures.

9. The memory control system of claim 1, wherein the memory controller further comprises a processor to execute the firmware.

10. The memory control system of claim 1, further comprising a processor, external to the memory controller, to execute the firmware.

11. A method, comprising:
receiving memory read/write requests at a memory controller;
upon failure of a portion of a memory module connected to the memory controller, i) mapping a spare memory location within the memory controller to the failed portion of the memory module, and ii) redirecting ones of the read/write requests directed to the failed portion of the memory module to the spare memory location.

12. The method of claim 11, wherein the spare memory location is a memory block.

13. The method of claim 11, wherein the memory controller comprises a plurality of said spare memory locations, and wherein the method further comprises:
tracking whether spare memory locations are in use as a result of permanent or intermittent errors and, upon use of all of the spare memory locations, managing use of the spare memory locations by remapping a spare memory location mapped to i) an intermittently failed portion of a memory module to ii) a permanently failed portion of a memory module.

14. The method of claim 11, wherein the memory controller comprises a plurality of said spare memory locations, and wherein the method further comprises:
tracking a distribution of failed portions of memory modules and, upon use of all of the spare memory locations, managing use of the spare memory locations by remapping a spare memory location mapped to i) a failed portion of a memory module that resides in an area of a memory module having more failures to ii) a failed portion of a memory module that resides in an area of a memory module having fewer failures.

15. A computer system, comprising:
a number of memory modules;
a memory controller, comprising,
a first interface to receive memory read/write requests;
a second interface to read/write data from the number of memory modules;
a memory cache containing spare memory locations; and
logic to, upon receipt of a memory read/write request, i) direct the read/write request to the memory cache when an address associated with the read/write request resides in the memory cache, and ii) direct the read/write request to the second interface when the address associated with the read/write request does not reside in the memory cache;
a processor, logically connected to the memory controller via the memory controller's first interface; and
firmware to, upon failure of a portion of a memory module connected to the second interface, cause one of the spare memory locations to be mapped to the failed portion of the memory module.

16. The computer system of claim 15, wherein the spare memory locations are memory blocks.

17. The computer system of claim 15, wherein, upon failure of the portion of the memory module connected to the second interface, the firmware causes contents of the failed portion of the memory module to be copied into the one of the spare memory locations.

18. The computer system of claim 15, wherein the firmware monitors error correction activity corresponding to read/write requests dispatched via the second interface, to determine when the portion of the memory module appears to have failed.

19. The computer system of claim 15, wherein the firmware tracks whether spare memory locations are in use as a result of permanent or intermittent errors and, upon exhaustion of the memory cache's capacity, the firmware manages use of the spare memory locations by causing a spare memory location mapped to i) an intermittently failed portion of a memory module to be remapped to ii) a permanently failed portion of a memory module.

20. The computer system of claim 15, wherein the firmware tracks a distribution of failed portions of memory modules and, upon exhaustion of the memory cache's capacity, the firmware manages use of the spare memory locations by causing a spare memory location mapped to i) a failed portion of a memory module that resides in an area of a memory module having more failures to be remapped to ii) a failed portion of a memory module that resides in an area of a memory module having fewer failures.

21. The computer system of claim 15, wherein the memory controller further comprises a processor to execute the firmware.

22. The computer system of claim 15, further comprising a management processor, external to the memory controller, to execute the firmware.

23. The computer system of claim 15, wherein the processor connected to the memory controller's first interface executes the firmware.

\* \* \* \* \*